United States Patent
Peterson et al.

(10) Patent No.: US 10,843,680 B2
(45) Date of Patent: Nov. 24, 2020

(54) MANAGING BATTERY AND ENGINE POWER TO PROPEL VEHICLE BASED ON UPCOMING ROAD FEATURE

(71) Applicant: Lenovo (Singapore) Pte. Ltd., New Tech Park (SG)

(72) Inventors: Nathan J. Peterson, Oxford, NC (US); Arnold S. Weksler, Raleigh, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 118 days.

(21) Appl. No.: 15/175,249

(22) Filed: Jun. 7, 2016

(65) Prior Publication Data
US 2017/0349161 A1 Dec. 7, 2017

(51) Int. Cl.
*B60W 20/12* (2016.01)
*B60W 10/06* (2006.01)
*B60W 10/08* (2006.01)
*B60W 50/00* (2006.01)

(52) U.S. Cl.
CPC ............ *B60W 20/12* (2016.01); *B60W 10/06* (2013.01); *B60W 10/08* (2013.01); *B60W 50/0097* (2013.01); *B60W 2552/00* (2020.02); *B60W 2556/45* (2020.02); *B60W 2556/50* (2020.02); *Y02T 10/6291* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 6,408,237 | B1 * | 6/2002 | Cho | B60R 21/013 180/169 |
| 8,285,433 | B2 * | 10/2012 | Ang | G01C 21/3407 701/22 |
| 8,725,331 | B2 * | 5/2014 | Yoshida | B60L 55/00 701/22 |
| 9,403,439 | B2 * | 8/2016 | Nakasako | H02P 9/04 |
| 9,758,153 | B2 * | 9/2017 | Ogawa | B60W 10/08 |
| 2010/0070128 | A1 * | 3/2010 | Johnson | G08G 1/096783 701/31.4 |
| 2016/0137185 | A1 * | 5/2016 | Morisaki | B60K 6/442 701/22 |
| 2017/0021730 | A1 * | 1/2017 | Ogawa | B60L 7/20 |
| 2017/0021820 | A1 * | 1/2017 | Ogawa | B60L 11/1861 |
| 2017/0021821 | A1 * | 1/2017 | Ogawa | B60W 10/06 |
| 2017/0021823 | A1 * | 1/2017 | Ogawa | B60W 20/12 |
| 2017/0028980 | A1 * | 2/2017 | Ogawa | B60K 6/445 |
| 2017/0028981 | A1 * | 2/2017 | Ogawa | B60K 6/445 |
| 2017/0088117 | A1 * | 3/2017 | Ogawa | B60W 10/08 |
| 2017/0144650 | A1 * | 5/2017 | Nagamiya | B60W 20/12 |

FOREIGN PATENT DOCUMENTS

EP    2 289 750 B1 * 10/2013
JP    2015-151320    * 7/2015

* cited by examiner

*Primary Examiner* — Basil T. Jos
(74) *Attorney, Agent, or Firm* — John M. Rogitz; John L. Rogitz

(57) ABSTRACT

In one aspect, a vehicle includes an engine, a battery, a processor, and storage accessible to the processor. The storage bears instructions executable by the processor to identify a road feature and, at least in part based on the identification, apportion power between the engine and the battery to propel the vehicle.

20 Claims, 5 Drawing Sheets

MANAGING BATTERY AND ENGINE POWER TO PROPEL VEHICLE BASED ON UPCOMING ROAD FEATURE

FIELD

The present application relates generally to managing battery and engine power to propel a vehicle based on an upcoming road feature.

BACKGROUND

Hybrid vehicles often charge their batteries using regenerative braking. However, as recognized herein, often times the vehicle's battery reaches fully charged before braking ends and therefore some of the charge potential resulting from braking the hybrid vehicle is not put to use. As also recognized herein, a better use can be made of this otherwise lost charge potential.

SUMMARY

Accordingly, in one aspect a vehicle includes an engine, a battery, a processor, and storage accessible to the processor. The storage bears instructions executable by the processor to identify a road feature and, at least in part based on the identification, apportion power between the engine and the battery to propel the vehicle.

In another aspect, a method includes identifying at least one upcoming road feature and, at least in part based on the identifying, managing use of power from an engine and a battery to propel a vehicle.

In still another aspect, a device includes a processor and storage accessible to the processor. The storage bears instructions executable by the processor to identify a road feature and, at least in part based on the identification, manage power from both an engine and a battery to propel a vehicle to the road feature.

The details of present principles, both as to their structure and operation, can best be understood in reference to the accompanying drawings, in which like reference numerals refer to like parts, and in which:

DETAILED DESCRIPTION

Figure 1:
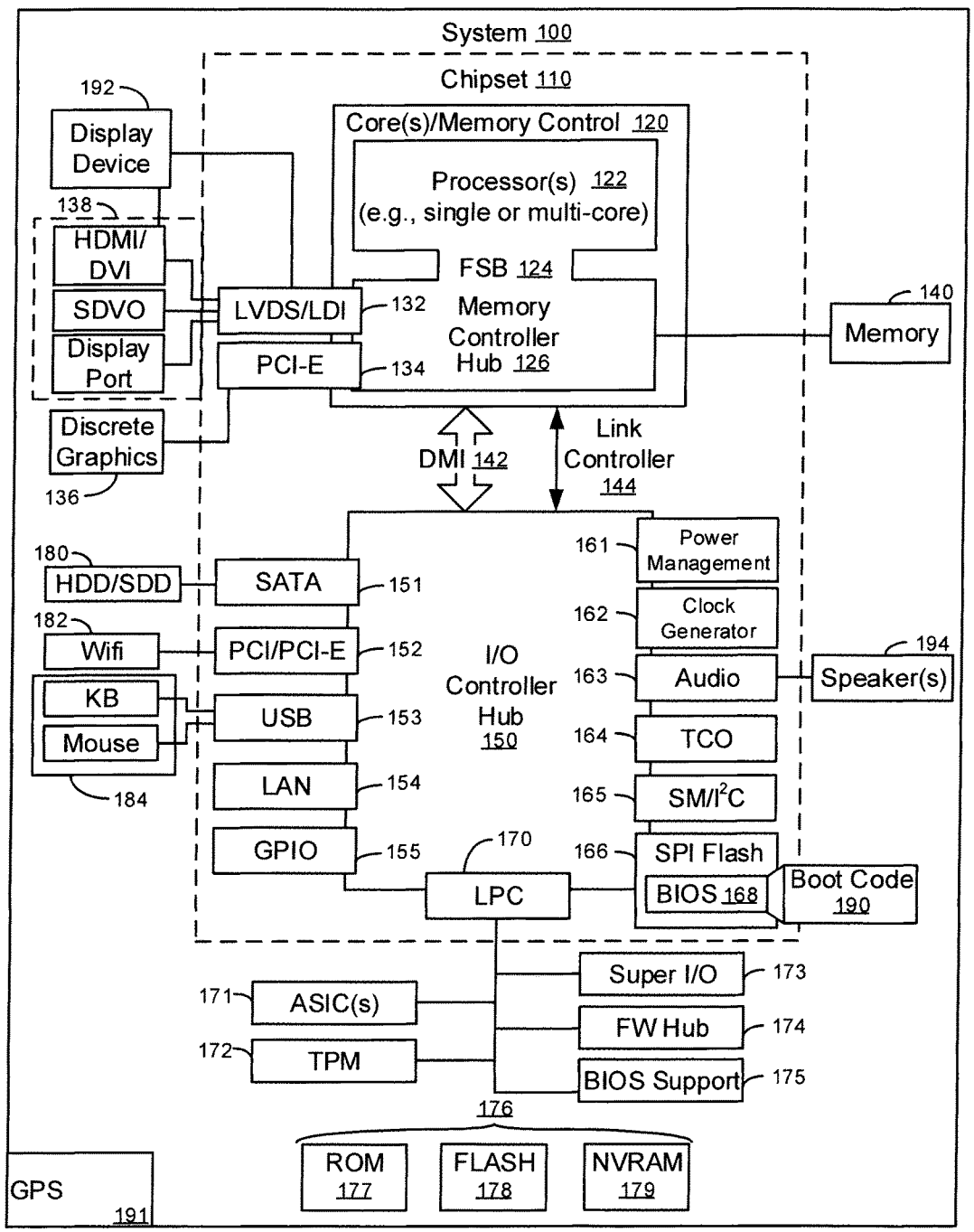
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, in some embodiments the system 100 may include a GPS transceiver 191 that is configured to receive geographic position information from at least one satellite and provide the information to the processor 122. However, it is to be understood that another suitable position receiver other than a GPS receiver may be used in accordance with present principles to determine the location of the system 100.

Though not shown for clarity, in some embodiments the system 100 may include a gyroscope that senses and/or measures the orientation of the system 100 and provides input related thereto to the processor 122, and an accelerometer that senses acceleration and/or movement of the system 100 and provides input related thereto to the processor 122. The system 100 may also include an audio receiver/microphone that provides input from the microphone to the processor 122 based on audio that is detected, such as via a user providing audible input to the microphone, as well as a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
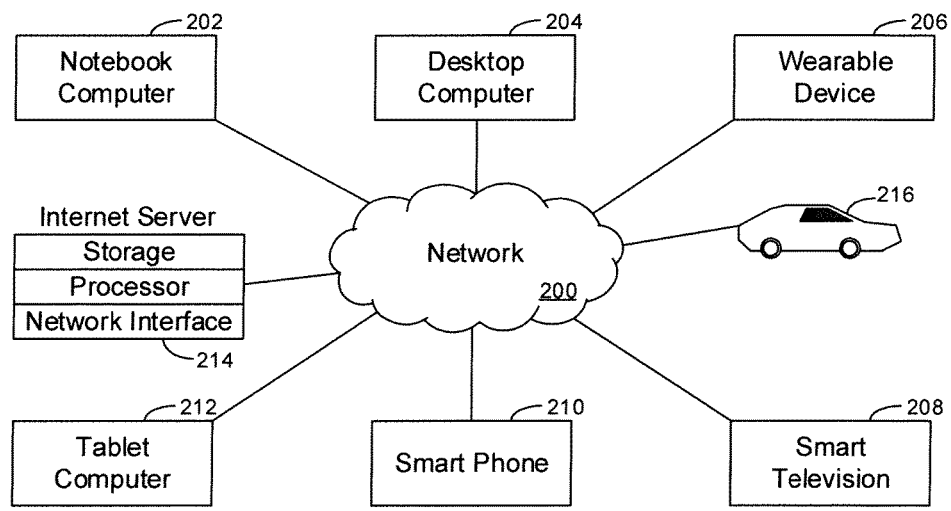
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a hybrid vehicle 216, and a server 214 such as an Internet server that may provide cloud storage accessible to the devices 202-212, 216. It is to be understood that the devices 202-216 are configured to communicate with each other over the network 200 to undertake present principles.

Figure 3:
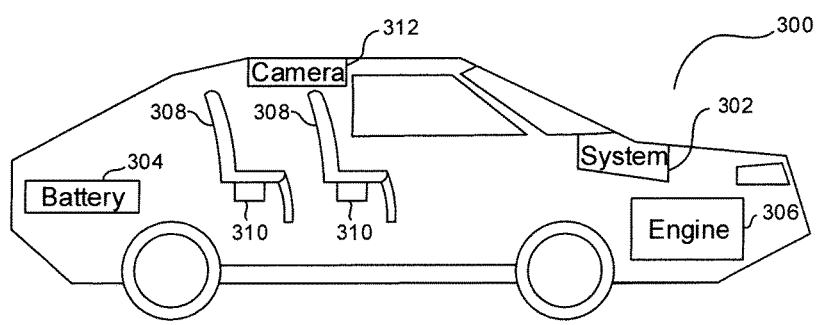
FIG. 3 is a block diagram of an example vehicle in accordance with present principles.

FIG. 3 shows an example hybrid vehicle 300 that may be similar to the vehicle 216 referenced above. The vehicle 300 may include a system 302 that may be similar to the system 100 described above and include components such as those set forth above in reference to the system 100. The system 302 may communicate with and control a battery and/or battery pack 304 that provides power to propel the vehicle 300. Additionally, the system 302 may receive data from the battery pack 304 pertaining to the state of charge of at least one battery within the pack 304 and other information related to the battery pack 304, which in some embodiments may be communicated to the system 302 by a battery management unit (BMU) in the battery pack 304. The BMU may include elements such as a processor, random access memory (RAM), and non-volatile storage bearing instructions executable by the BMU's processor. The battery pack 304 may also include one or more sensors for sensing and measuring things related to one or more battery cells in the battery pack 304, such as voltage, degradation, impedance, state of charge, temperature, current, etc. The sensors may provide input/measurements to the BMU's processor and/or the processor(s) 122.

The system 302 may also communicate with and control an internal combustion engine 306 that also provides power to propel the vehicle 300. The engine 306 may be a fossil fuels-powered engine, such as a gasoline-powered engine or a diesel-powered engine.

In some embodiments, the vehicle 300 may also include plural seats or chairs 308 in which a driver and passengers in the vehicle 300 may sit. Each seat or chair 308 may include a weight sensor 310 that senses the weight of a person sitting in the respective seat in which the respective sensor 310 is disposed and provide input pertaining to the weight of a passenger to the system 302 in accordance with the disclosure below. Additionally, in some embodiments the vehicle 300 may include a camera 312 for gathering images of people in the vehicle 300 and providing the images to the system 302 also in accordance with the disclosure below.

Still further, though not shown for clarity, it is to be understood that the vehicle 300 may include brakes for slowing and stopping the vehicle, as well as a regenerative braking mechanism for harvesting kinetic energy during braking of the vehicle to charge battery cells within the battery 304 through a battery charger that may also be included on the vehicle 300. Still other ways of charging the vehicle's battery may be used, such as charging the battery using energy taken from the engine 306 (e.g., using an alternator).

Even further, note that the vehicle may include an odometer and a speedometer to respectively monitor revolutions per minute (RPMs) of the vehicle's engine and the speed of the vehicle in accordance with present principles.

Figure 4:
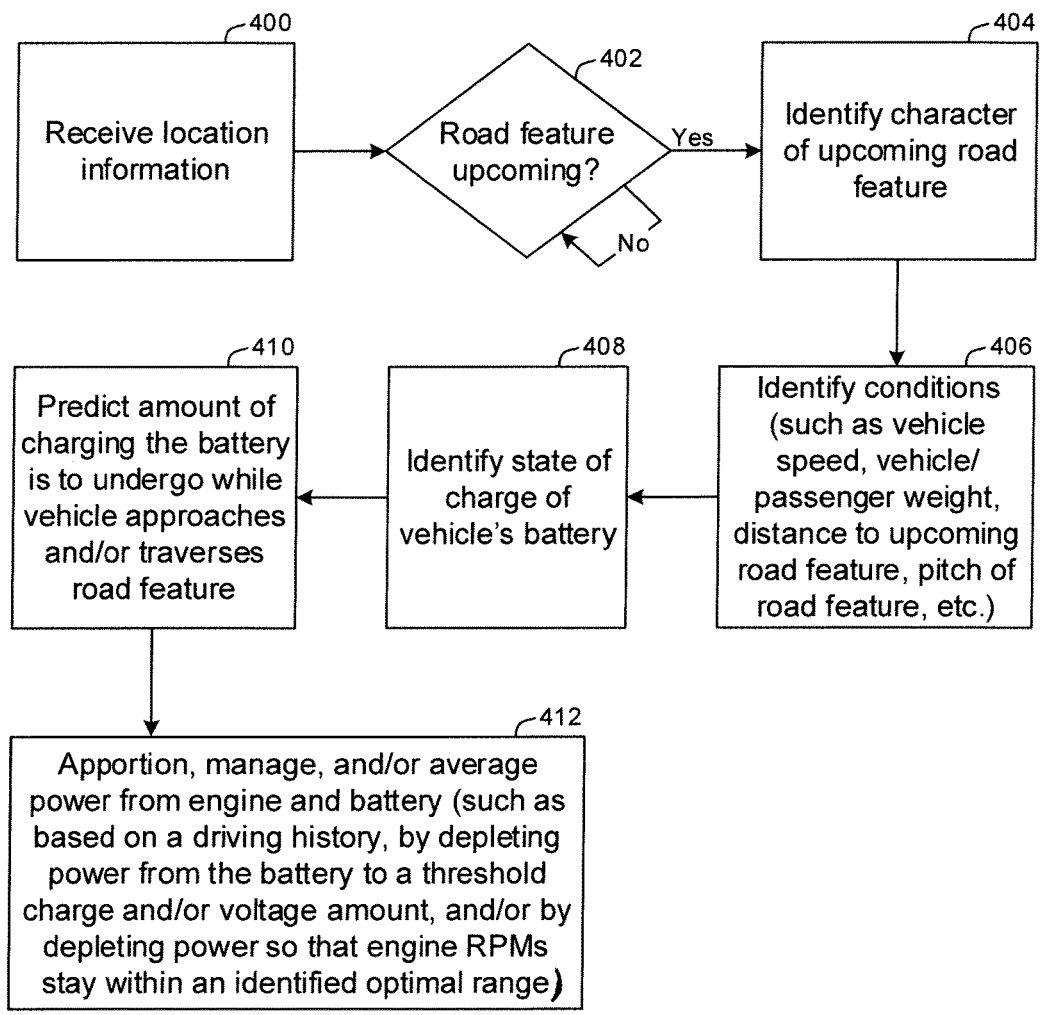
FIG. 4 is a flow chart of an example algorithm in accordance with present principles.

Referring to FIG. 4, it shows example logic that may be executed by a device such as the system 100 and/or the vehicle 300 in accordance with present principles (referred to when describing FIG. 4 as the "vehicle" for simplicity). Beginning at block 400, the logic receives location information pertaining to a location of the vehicle and its surroundings, including any road features on the road and/or path being traveled by the vehicle. The location information may include GPS coordinates and/or altitude data pertaining to a location of the vehicle as received from a GPS transceiver on the vehicle. The location information may also include information accessible to the vehicle and/or transmitted to the vehicle, such as map information from which roads and road features may be identified, traffic information such as from a website providing real time traffic updates regarding locations of traffic accidents, and road construction information such as from a government works website regarding locations of road construction.

The logic may then move from block 400 to block 402 where the logic may determine whether a road feature is upcoming based on the location information and in some embodiments based on a driving history pertaining to the vehicle. This may be done, for example, by comparing previously received or historical GPS coordinates for a road feature to current GPS coordinates for the vehicle to determine whether the vehicle is within a threshold distance of the road feature and hence whether it is upcoming. Based on the driving history, the vehicle may even determine whether a road feature on another road may be upcoming based on the vehicle previously driving a particular path along plural roads including the other road for which the road feature is identified.

A negative determination at diamond 402 causes the logic to continue making the determination thereat until an affirmative one is made. Once an affirmative determination is made, the logic may move to block 404 where the logic may identify the character and/or nature of the upcoming road feature, such as based on the driving history or based on metadata indicating its character that is received with the location information at block 400. Examples of road features include a traffic signal (e.g., a traffic light having red, yellow, and green signal indications), a traffic accident, a stop sign, a yield sign, road construction, a portion of a road having an incline, a portion of a road having a decline, a portion of a road affected by inclement weather such as a road with ice or snow on it, etc.

From block 404 the logic may move to block 406. At block 406 the vehicle may identify and/or estimate a speed and direction of the vehicle, a distance until the upcoming road feature will be reached by the vehicle, and a degree of one or more pitches (e.g., inclines or declines) to be traversed to the upcoming road feature. The vehicle may also identify a total weight of the vehicle, such as based on weight data stored in storage accessible to the vehicle. The total weight may also be identified and/or estimated based on input from a sensor on the vehicle that senses the current total weight of the vehicle and all occupants and objects. Still further, the total weight may be identified based on an identified weight of at least one person in the vehicle (e.g., as identified based on input from a weight sensor in a seat of the vehicle such as one of the sensors 310 described above), and/or an identification of a number of people in the vehicle (e.g., as identified based on input from a camera in the vehicle such as the camera 312 described above) to then estimate the weight of the people, which in either case may then be combined with the known weight of the vehicle itself to identify a total current weight.

After block 406 the logic may proceed to block 408. At block 408 the logic may identify the state of charge of the vehicle's battery and/or the current voltage of the battery. Information pertaining to the state of charge/voltage of the battery may be received directly from sensors in the vehicle's battery and/or from a battery management unit (BMU) in the vehicle's battery that received data from sensors in the battery. The state of charge may be expressed as a current charge amount percentage relative to fully charged, and/or the state of charge may be expressed as the current voltage itself.

After block 408 the logic may move to block 410 where the logic may predict an amount of charging the battery is to undergo while the vehicle approaches and/or traverses the road feature, such as may occur using a regenerative braking mechanism in the vehicle to charge the battery using kinetic energy produced during braking and/or using the vehicle's engine as a generator for charging the battery. As an example of charging the battery may undergo while approaching a road feature, the road feature may be a stop sign and hence braking and the corresponding battery charging may occur as the vehicle slows down as it approaches the stop sign. As an example of charging the battery while traversing the road feature, the road feature may be a decline and hence braking and the corresponding battery charging may occur as the vehicle brakes while traversing the decline so that the vehicle does not reach an excessive speed.

To predict an amount of charging the battery is to undergo while the vehicle approaches and/or traverses the road feature, a driving history stored at and/or accessible to the vehicle may be accessed to determine an amount of charging the battery underwent in at least one previous instance that the same road feature was approached and/or traversed. This information may be stored in a relational database correlating respective road features to charging data pertaining to one or more charge amounts the battery underwent while approaching and/or traversing the road feature to thus predict that the vehicle's battery will be charged the same charge amount as the vehicle again approaches and/or traverses the road feature. Furthermore, in some embodiments the charge amounts indicated in the history for one particular road feature approached and/or traversed in the past may vary in the history based on previous conditions that were identified, and hence one of those charge amounts may be selected from the history as the one to use for the prediction at block 410 based on past conditions for a given charge amount matching one or more current conditions identified at block 406.

For example, more braking power may be needed in some instances to slow or stop the vehicle with three people inside as opposed to one person inside owing to the additional total weight being higher because of the two additional people. Thus, the battery may be predicted to undergo greater charging while approaching and/or traversing the same road feature with three people in the vehicle as opposed to one person in the vehicle.

The other conditions that are identified at block 406, such as vehicle speed, may also be used to predict a particular charge amount using the driving history in a similar manner. For example, greater braking power may be needed in some instances to stop the vehicle as it approaches a stop sign at one speed as opposed to when approaching the stop sign at a lesser speed, and hence the vehicle may predict that the battery will undergo more charging at a higher speed than if the vehicle were approaching the same stop sign at the slower speed based on data in the history indicating previous charge amounts while approaching the stop sign at the different speeds.

Further, if an upcoming road feature does not have information related thereto stored in the driving history, but a road feature having a similar character to the one that is identified as upcoming can be identified from the driving history (such as both road features being declines of the same or substantially the same degree), information for the similar road feature may be used to make the prediction at block 410. For example, if an upcoming road feature is a decline of substantially the same distance and degree as a different decline previously traversed by the vehicle, charge information in the driving history pertaining to the different road feature may be used to predict that an amount of charging the vehicle's battery will undergo traversing the upcoming decline will be the same as the amount of charging the battery underwent while traversing the other road feature indicated in the history.

From block 410 the logic may next move to block 412. At block 412 the logic may apportion and/or manage power from both the engine and battery to use more power from the battery than if the upcoming road feature had not been identified, and hence use less engine fuel based on the identification than would otherwise be used. The apportionment and/or management may be done at least in part based on the driving history and/or the prediction disclosed above to determine how much battery power to use and for how long. Additionally or alternatively, it may also be done based on an optimal engine use range for one or more of the identified conditions, where the battery is used to propel the vehicle at a user-desired speed enough for engine use (e.g., RPMs) to stay within the optimal range to, for instance, maximize engine fuel efficiency.

In one example, a relational database may be stored at and/or accessible to the vehicle that correlates various conditions or sets of conditions with respective optimal engine use numbers or ranges for those conditions that keeps the engine's RPMs at a level that maximizes fuel efficiency for the given conditions and/or while still maintaining the user-desired vehicle speed. Remaining power that may be needed to maintain the vehicle's speed beyond that which is produced while the engine is in an optimal engine use range may then be apportioned from the battery, and hence the battery may be depleted more than usual, but will also be charged relatively shortly owing to the upcoming road feature at which the charging of the battery is predicted to occur.

Further, in some embodiments during such an apportionment and/or management, battery power may be depleted only to a threshold total amount from fully charged to propel the vehicle while keeping the engine's RPMs within an optimal range, and thereafter the engine may be managed to provide increased power to maintain the user-desired speed. This threshold may be a state of charge threshold expressed as a percentage from fully charged as established by a provider/manufacturer of the vehicle, and/or may be a voltage threshold established by a provider of the vehicle. Moreover, the optimal ranges themselves that may vary based on the one or more conditions identified at block 406 may also established by a provider/manufacturer of the vehicle.

Additionally, in some embodiments use of power from the engine and the battery may be managed to propel the vehicle at least in part by averaging power from the battery from a current charge level to the threshold charge level lower than the current charge level throughout travel to and/or traversal of the upcoming road feature to propel the vehicle using a constant or substantially constant amount of power from the battery throughout approach to and/or traversal of the upcoming road feature.

Providing an example, suppose the vehicle determines that a decline is upcoming, and that during a previous traversal of the decline the battery was charged during braking down the decline to fully charged by the time the vehicle reached half way down the decline. In this previous instance the battery could have undergone additional charging during traversal of the second half of the decline while braking took place had it not reached fully charged so soon, and hence the vehicle may deplete power from the battery by a greater amount when currently approaching the decline than an amount that existed when the vehicle began to traverse the decline in the previous instance, thereby consuming less engine fuel while approaching the decline while still charging the battery to fully charged by the end of the decline.

Figure 5:
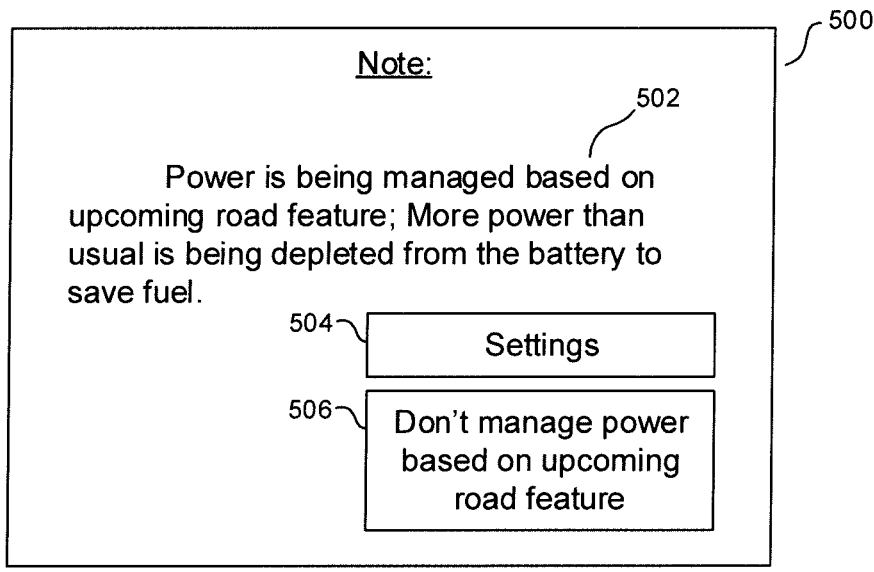
FIGS. 5 and 6 are example user interfaces (UIs) in accordance with present principles.

Continuing the detailed description in reference to FIG. 5, it shows an example user interface (UI) 500 presentable on a display, such as a display of the vehicle described above in reference to FIG. 4. The UI 500 may be presented based on and/or responsive to identification of an upcoming road feature as disclosed herein. Thus, an indication 502 may be presented on the UI 500 that indicates that power is being managed based on an upcoming road feature and that more power than usual is being depleted from the vehicle's battery to save engine fuel.

In some embodiments, the UI 500 may also include a selector 504 that is selectable to automatically without further user input cause the device to present a UI for configuring power management settings in accordance with present principles, such as the UI 600 of FIG. 6 to be described below. The UI 500 may further include a selector 506 that is selectable to automatically without further user input cause the device to stop managing power based on the upcoming road feature that has been identified and/or based on all road features that may be identified as upcoming in the future, and hence apportion power to propel the vehicle between the battery and engine without accounting for potential upcoming opportunities to charge the battery as disclosed herein.

Figure 6:
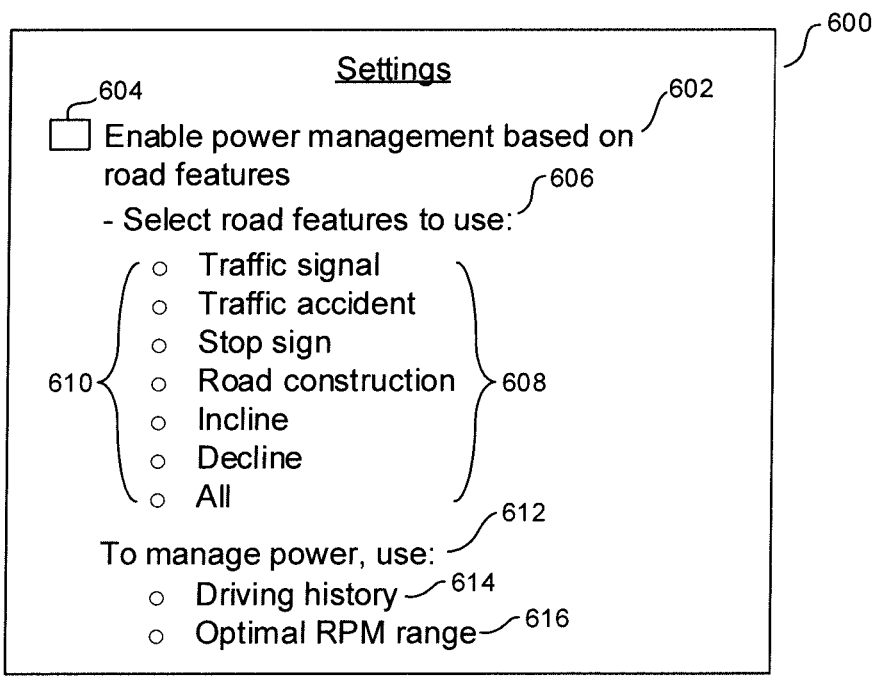

FIG. 6 shows the aforementioned UI 600, which is an example of a UI for configuring power management settings for a vehicle in accordance with present principles. The UI 600 includes a first option 602 selectable by checking the check box 604 to enable power management based on identification of upcoming road features as disclosed herein. Furthermore, in some embodiments the UI 600 may include a sub-option 606 listing various types of road features 608 that may be respectively selected using respective radio buttons 610, once option 602 is enabled using box 604, to configure the vehicle to manage or apportion power as disclosed herein based on the selected types of road features but not the unselected ones.

The UI 600 shown in FIG. 6 may also include a setting 612 listing various ways that power management and/or apportionment may be implemented. Thus, a first option 614 may be presented that is selectable using the respective radio button presented adjacent thereto to use a driving history to do so, while a second option 616 may be presented that is selectable using the respective radio button presented adjacent thereto to use an optimal engine use range.

Figure 7:
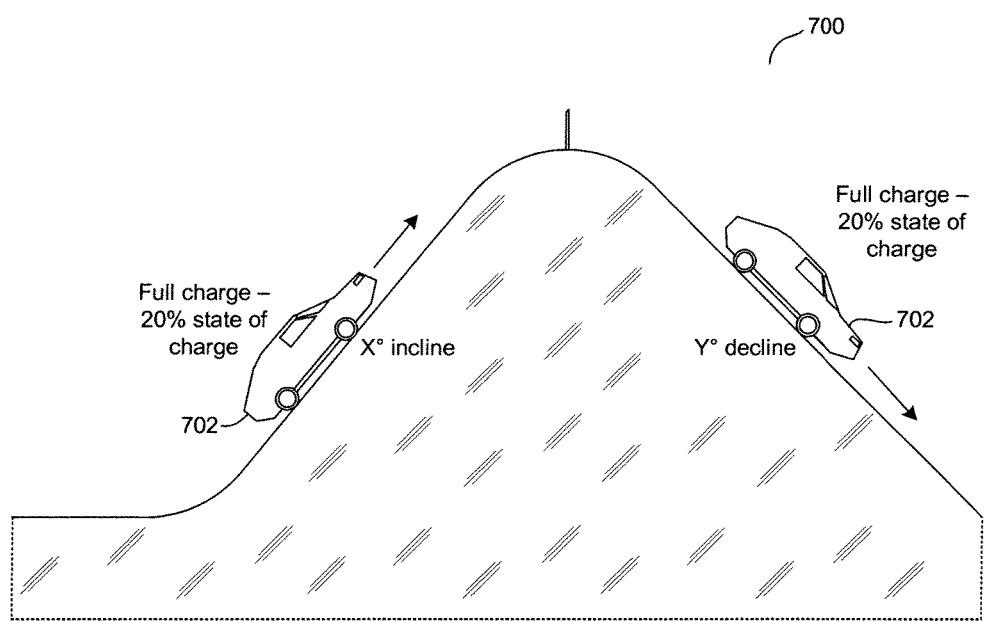
FIG. 7 is an example illustration in accordance with present principles.

FIG. 7 is an illustration 700 in accordance with present principles. It shows a vehicle 702 first traversing an incline of X degrees and then traversing a decline of Y degrees. Based on the vehicle 702 accessing a driving history pertaining to a previous instance the vehicle traversed the decline during which the battery was charged from a twenty percent state of charge to fully charged, the vehicle 702 may determine in the present instance that it can deplete power from its battery to twenty percent as averaged evenly over the distance of the incline and/or duration of traversal of the incline and only use as much engine fuel beyond that as may be needed for the vehicle 702 to maintain a current speed as it traverses the incline. Thus, in this example, even if depleting the battery to a twenty percent state of charge would not occur during traversal of the incline had the decline not been identified (e.g., so as to leave additional power in the battery for future unexpected needs), the vehicle may deplete the battery to twenty percent, based on identification of the decline, while traversing the incline because the battery is predicted to be charged as the vehicle traverses the upcoming decline, thereby saving fuel in the process.

In accordance with present principles, it is to be understood that the term "road" as used herein may reference not only surface streets but also highways, freeways, dirt roads, and any other path on which a vehicle may drive.

It may now be appreciated that present principles provide for using, for example, GPS data and/or past driving data so that a vehicle may build efficiency as it is approaching slopes, hills, etc. The vehicle may be an autonomous vehicle and/or a self-driving vehicle, or a vehicle driven by a person. In any case, the vehicle may calculate for how long the vehicle can be propelled using battery power over an identified distance at an identified speed over an identified time before the battery should undergo charging to avoid being depleted beyond a threshold amount, and if a charging instance is determined to occur within the identified distance and/or identified time, the vehicle may use predominantly (if not exclusively) battery power leading up to the charging instance.

Thus, for example, a hybrid vehicle may use up its battery power before getting to a downhill slope that it usually is able to charge the battery back to fully battery charged while traversing. The vehicle may thus back off using the gas and depend on the battery more before getting to the downslope.

For an uphill case, in one example an optimal engine RPM for charging the vehicle's battery may be identified and used to charge the battery and still maintain a relatively decent level of fuel efficiency (e.g., miles per gallon). Thus, for example, if the vehicle is approaching an incline, the vehicle can conserve a battery charge for traversing the incline while using a relatively lower RPM and hence less fuel while approaching the incline. The vehicle may also charge the battery to reach a higher charge level while approaching the incline while the engine is at a more optimal RPM for charging. Then, when going up the incline, the vehicle may determine for how long the vehicle will be going up the incline and use the battery at a relatively slow rate in order to prolong battery usage throughout traversal of the incline, rather than using up all battery power traversing a first portion of the incline or using an unnecessary amount of engine fuel to traverse the incline. This can lower the maximum engine RPM needed to get up the incline, and result in a better fuel efficiency.

Data usable for such purposes may be "learned" by the vehicle by maintaining a past driving history including data pertaining to the same road and/or similar roads. Other data usable for such purposes may include a current number of passengers in the vehicle, current traffic conditions (such as identifying if there's going to be expected stops or slowdowns along a route being traveled, where the stops/slowdowns are located, and how long they are expected to last in terms of time and/or distance), and/or using GPS data for determining distances and altitudes to be traversed.

Weather conditions may also have an effect on engine efficiency, so data pertaining to such weather conditions may also be taken into account for when to charge or discharge the battery. For example, if a road that is icy is typically traversed faster when not icy, the vehicle may determine that a relatively slower speed than in the past will be used to traverse the icy road so that the driver does not lose control of the vehicle. Based on this, the vehicle may predict that the battery may be charged a certain amount more using regenerative braking. As another example, fuel efficiency may increase as an ambient temperature surrounding the vehicle increases, and the vehicle may thus account for this as well.

Providing a few additional examples of when present principles may be used, a first example includes a vehicle using its battery relatively heavily before approaching a downhill slope that will help charge the vehicle, and/or using enough charge to propel the vehicle so that the battery is in an optimal charge range by the time the car gets to the bottom of the downhill.

As a second example, when the vehicle approaches known or identified stop signs, the vehicle may use some battery capacity as it approaches the stop sign if the battery is close to fully charged so that it may be charged back to fully charged via regenerative braking as the vehicle brakes while approaching the stop sign. This example may also apply to stop lights and/or traffic signals as well, and furthermore the vehicle may receive and/or identify information regarding light cycles (e.g., for switching between red, yellow, and green lights) to predict whether regenerative braking may be used if approaching the light when red or if battery power should be conserved more if the vehicle predicts it will reach the traffic signal while it is green and hence the vehicle would proceed without braking.

As a third example, the battery may be charged to fully charged (e.g., as fully charged as possible for the battery depending on battery age, battery use, battery degradation, etc.) such as when the engine RPMs are within an optimal engine RPM range (e.g., for charging the battery) before getting to an uphill slope, and then the vehicle may "trickle" battery usage throughout the duration of the traversal of the slope to keep engine RPMs as low as possible.

As a fourth example, when the vehicle determines that it is approaching a traffic accident, the vehicle may use the battery to propel the vehicle (e.g., more than it would otherwise use and hence would use the engine instead had it not been approaching the accident), assuming that braking will occur while passing the traffic accident and hence regenerative braking can charge the battery back to where it was prior to the determination that the vehicle was approaching the traffic accident, and even further charging the battery beyond its previous charge amount when the determination was made in some embodiments.

Before concluding, it is to be understood that although a software application for undertaking present principles may be vended with a device such as the system 100 and/or vehicle 300, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A vehicle, comprising:
an engine;
a battery;
at least one processor; and
storage accessible to the at least one processor and comprising instructions executable by the at least one processor to:
identify at least one upcoming road feature; and
at least in part based on the identification of the at least one upcoming road feature, apportion power between the engine and the battery to propel the vehicle at least in part by averaging power from the battery from a current charge level to a threshold charge level lower than the current charge level throughout travel to the at least one upcoming road feature to propel the vehicle to the at least one upcoming road feature.

2. The vehicle of claim 1, wherein the instructions are executable by the at least one processor to:
predict an amount of charging the battery is to undergo while the vehicle one or more of approaches at least one road feature and traverses the at least one road feature; and
at least in part based on the prediction, apportion power between the engine and the battery to propel the vehicle.

3. The vehicle of claim 2, wherein the at least one road feature comprises a decline, and wherein the instructions are executable by the at least one processor to:
at least in part based on the identification of the decline, apportion power at least in part by depleting power from the battery to no more than a threshold total amount to propel the vehicle to the decline.

4. The vehicle of claim 1, wherein power is apportioned so that revolutions per minute (RPMs) for the engine stay within an optimal range.

5. The vehicle of claim 4, wherein the optimal range maximizes fuel efficiency under at least one identified condition.

6. The vehicle of claim 4, wherein the optimal range varies based on one or more of: a weight of the vehicle, a speed to be traveled to the at least one road feature.

7. The vehicle of claim 1, wherein the instructions are executable to:
identify a weight of at least one person in the vehicle based on input from a camera in the vehicle; and
at least in part based on the identification of the weight of the at least one person in the vehicle, apportion power between the engine and the battery to propel the vehicle.

8. The vehicle of claim 1, wherein the instructions are executable to:
identify a weight of the person based on input from a weight sensor in the vehicle; and
at least in part based on the identification of the weight of the person in the vehicle, apportion power between the engine and the battery to propel the vehicle.

9. The vehicle of claim 1, wherein the instructions are executable to:
identify an amount of people in the vehicle based on input from a camera in the vehicle; and
at least in part based on the identification of the amount of people in the vehicle, apportion power between the engine and the battery to propel the vehicle.

10. A computer-implemented method, comprising:
identifying at least one upcoming road feature;
managing, at least in part based on the identifying, use of power from an engine and a battery to propel a vehicle; and
presenting a graphical user interface (GUI) on an electronic display, the GUI comprising a selector that is selectable enable power management based on identifying upcoming road features;
wherein the at least one upcoming road feature comprises a decline, and wherein the method comprises:
at least in part based on the identifying, managing use of power from the engine and the battery to propel the vehicle at least in part by averaging power from the battery from a current charge level to a threshold charge level lower than the current charge level throughout travel to the decline to propel the vehicle to the decline.

11. The method of claim 10, wherein the at least one upcoming road feature comprises one or more of the group consisting of: a stop sign, a yield sign.

12. The method of claim 10, wherein the at least one upcoming road feature comprises an incline.

13. The method of claim 10, comprising:
at least in part based on the identification and based on an optimal engine use range for an identified condition, managing use of power from the engine and the battery to propel the vehicle.

14. The method of claim 13, wherein the condition is selected from the group consisting of:
an identified weight of at least one person in the vehicle as identified based on input from a camera in the vehicle, an identified weight of at least one person in the vehicle as identified based on input from a weight sensor in the vehicle.

15. The method of claim 13, wherein the condition comprises an amount of people in the vehicle as identified based on input from a camera in the vehicle.

16. A computer readable storage medium (CRSM) that is not a transitory signal, the computer readable storage medium comprising instructions executable by at least one processor to:
identify at least one road feature;
predict an amount of charging a battery is to undergo while a vehicle traverses the at least one road feature; and
at least in part based on the prediction, average power from the battery from a current charge level to a threshold charge level lower than the current charge level as the vehicle approaches the at least one road feature to propel the vehicle to the at least one road feature.

17. The CRSM of claim 16, wherein power is averaged based at least in part on an optimal engine use range for an identified condition.

18. The CRSM of claim 16, wherein the instructions are executable to:
present a graphical user interface (GUI) on an electronic display accessible to the at least one processor, the GUI comprising a selector that is selectable to command the vehicle to stop managing power based on the identification, wherein the GUI comprises an indication that power is being managed based on the at least one road feature, the GUI being presented based on identification of the at least one road feature.

19. The CRSM of claim 16, wherein the instructions are executable to:
manage power from an engine of the vehicle and the battery to propel the vehicle to the at least one road feature based at least in part on an amount of people in the vehicle as determined based on input from the camera in the vehicle.

20. The CRSM of claim 16, wherein the instructions are executable by the at least one processor to:
manage power from an engine in the vehicle and the battery to propel the vehicle to the at least one road feature at least in part based on a weight of at least one person in the vehicle as identified based on input from one or more of: a weight sensor in the vehicle, a camera in the vehicle.

* * * * *